United States Patent [19]
Terry

[11] 3,843,893
[45] Oct. 22, 1974

[54] LOGICAL SYNCHRONIZATION OF TEST INSTRUMENTS

[75] Inventor: Frank Duncan Terry, Woodland Park, Colo.

[73] Assignee: Hewlett-Packard Company, Palo Alto, Calif.

[22] Filed: July 20, 1973

[21] Appl. No.: 381,207

[52] U.S. Cl. ............................. 307/87, 324/76 R
[51] Int. Cl. .......................................... G01r 31/00
[58] Field of Search ........ 307/87, 238, 269; 324/76, 324/73 R, 76 R; 321/121 R; 315/8.5; 340/173 AM, 146.2; 328/37, 152

[56] References Cited
UNITED STATES PATENTS
3,598,979  8/1971  Moreau.............................. 328/37
3,766,316  10/1973  Hoffman et al...................... 328/37

Primary Examiner—Robert K. Schaefer
Assistant Examiner—M. Ginsburg
Attorney, Agent, or Firm—Ronald E. Grubman

[57] ABSTRACT

An electronic test instrument is synchronized to a digital electronic system under test by sending a trigger signal to the test instrument when a sequence of bits on some channel of the digital instrument under test corresponds to a predetermined bit pattern. In accordance with various of the disclosed embodiments, the trigger signal is sent only when the correspondence between the two bit patterns occurs within a certain window in time, the window being related to the occurrence of one or more particular events on one or more of the signal channels from the digital instrument under test.

15 Claims, 8 Drawing Figures

LOGICAL SYNCHRONIZATION OF TEST INSTRUMENTS

BACKGROUND AND SUMMARY OF THE INVENTION

Electronic test instruments such as oscilloscopes typically incorporate a triggering mechanism to synchronize the test instrument to a device or system under test. Traditionally, the test instrument is triggered by sensing some particular analog property of an input signal from the system being tested. For example, triggering has been done using the amplitude, frequency, or slope of the input signal. When the input signal is an analog signal, these quantities usually provide a suitable basis for triggering the test instrument. But when the system under test is a digital system these same quantities cannot be used satisfactorily for triggering. The basic difficulty is that the input signal from the digital system is typically a binary sequence of "high" and "low" voltage levels representing respectively 1 or 0 information bits. All parts of this input signal have similar amplitudes, similar rise times (slope), and similar frequency content. Consequently, it is impossible to select a unique triggering point in the input signal by detecting any of these quantities. It has therefore been very difficult to use standard test equipment, such as oscilloscopes, to test and troubleshoot digital systems, since only a blurred image or a "chattering" image will appear on the test device if it is not properly synchronized to the signals from the system under test. Instead, what has been done is to design particular logic blocks and other special electronic tools dedicated to a digital system to be tested. These special test devices are then used to check out the particular digital system with which they are compatible. However, it is difficult and time consuming to design specialized logic test equipment which will function when the digital system is operating at its normal operating speed. Instead, much of the testing is done in a single-step mode in which the digital equipment is artificially stepped through its operating cycle one bit at a time. But since there are often failure modes that occur only when the system is operating at speed, these failures will go undetected by a single-step checkout procedure.

It would thus be desirable to have the capability of synchronizing a standard piece of test equipment, such as an oscilloscope to different digital systems, so that the test equipment could be used directly to check out and troubleshoot these systems. To be most effective, the synchronization capability should enable a user to obtain a clear and stable image of the test signal, even when the digital system is operating at speed.

In accordance with the illustrated preferred embodiments, the present invention provides a method of synchronizing a test instrument to a digital system, subsystem, or circuit under test. The method utilizes particular sequences of logical events which occur in the digital signal from the system under test to provide a basis for generating a trigger signal which synchronizes the test instrument to the system being tested. The logical events involved in the sequence used as a trigger signal may be a simple event such as the occurrence of a 1 bit or a 0 bit. But the logical events may also be more complex, including such things as a particular sequence of 1 and 0 bits, an absolute time interval referenced to a particular event (which may be a simple event or may itself be a logical event), a predetermined number of clock cycles following a particular event, or the time interval between two defined events. The various logical events can be sensed or created appropriately by means of standard digital electronic devices such as digital memories, counters, clocks, and binary comparators.

For some applications, it is desirable that a particular logical event should provide a trigger only during certain windows in time. For example, it may be desired that a first logical event (such as a predetermined number of clock cycles) on a particular channel should provide the "window" within which the occurrence of another logical event on a different channel would provide a trigger. This kind of arrangement would be useful in connection with data bus structures in which information from many sources is included in one data channel. For example, in many computers and calculators there is a main data bus line on which is transmitted data from many sources, as well as memory addresses indicating the source and/or destination of the data, and perhaps also command instructions. In many cases, an additional line is provided which is "high" when the corresponding information bits on the main data bus represent addresses and "low" otherwise. Thus, if it is desired to inspect only the information following the transmittal of a certain address, the auxiliary line can provide the "window", within which the occurrence of a particular bit sequence on the data bus is assured to represent an address rather than data or a command. As discussed above, the occurrence of a particular sequence of bits (a unique address) within the "window" can provide a trigger which will synchronize the test instrument to the digital system so as to display the information on the data bus which follows the particular address. The window may also be defined by other means, such as by counting a predetermined number of clock cycles from an event sensed on a particular channel, or by measuring an absolute time interval from an event sensed on some channel. Or, in the case of a multi-channel device, it might be desirable that a particular "serial" bit pattern appearing on one channel should provide a trigger only if it follows the occurrence of a particular "parallel" bit pattern appearing across several of the channels. Another useful embodiment is one in which a window is opened in any of the ways discussed above, and is subsequently closed only by the occurrence of the searched for particular sequence of bits.

DESCRIPTION OF THE INVENTION

Figure 1:
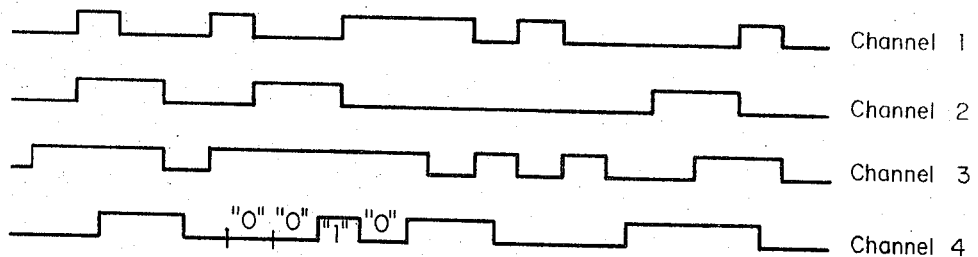
FIG. 1 illustrates several data channels from a digital electronic instrument, including a channel containing information used to instigate the sending of a trigger signal to a test instrument.

In FIG. 1 there are illustrated typical sequences of 1 and 0 information bits on four channels of a multichannel device under test. According to one embodiment of the present invention the signal on one of these channels (channel 4 being chosen here for purposes of illustration) would be detected and a trigger signal sent to the electronic test instrument whenever a sequence of the bits in channel 4 corresponded to a preselected bit pattern. For example, the test instrument could be triggered upon the occurrence of a sequence 0, 0, 1, 0 as shown in the figure. The predetermined bit pattern chosen should preferably be a sequence which is unique to the particular channel which is being used. For example, when the instrument under test is a digital computer, the particular bit sequence chosen might be a sequence representative of a particular operation which occurs once during an operating cycle. Alternately, the bit sequence chosen may represent the conjunctive occurrence of two particular operations, each of which may occur frequently during the operating cycle, but which occur in direct conjunction with each other only once.

Figure 2:
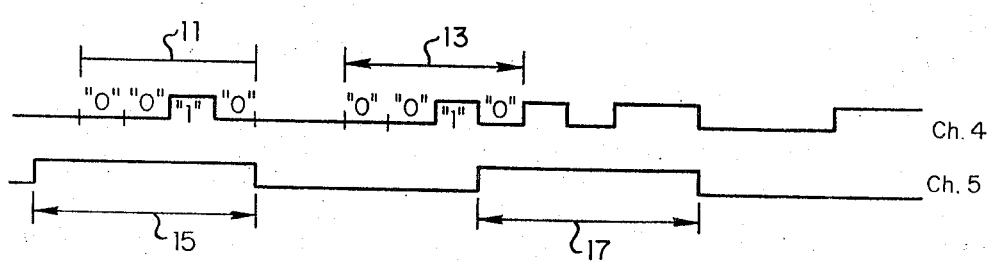
FIG. 2 illustrates an embodiment of the invention in which a second channel provides windows in time within which a trigger may be sent.

FIG. 2 illustrates an embodiment of the invention which is useful when no unique pattern can be found upon which to base the sending of a trigger signal. In the figure, channel 4 again carries information which will be sensed to indicate when a trigger signal should be sent to the test instrument. In this embodiment of the invention, however, the trigger signal is enabled to be sent only if a match between a sequence of bits on channel 4 and the preselected pattern occurs completely within a certain "window" in time. The channel labeled 5 carries information which may be used to provide the "window". As an example, suppose the trigger signal is to be sent when there occurs on channel 4 the bit pattern 0, 0, 1, 0. It can be seen that this particular bit sequence is not unique but occurs twice, one occurrence labeled 11 and the other occurrence labeled 13. However, on channel 5 there appears a series of "windows" which for illustrative purposes are shown as being sequences of 1 bits each sequence being 5 units long. Two of these windows are labeled 15 and 17 respectively. It may be seen that the bit sequence 11 falls entirely within the time window 15 whereas the bit sequence 13 does not fall entirely within any window. Thus, in accordance with this embodiment of the present invention the bit sequence 11 would instigate a trigger signal while the bit sequence 13 would not.

Figure 3:
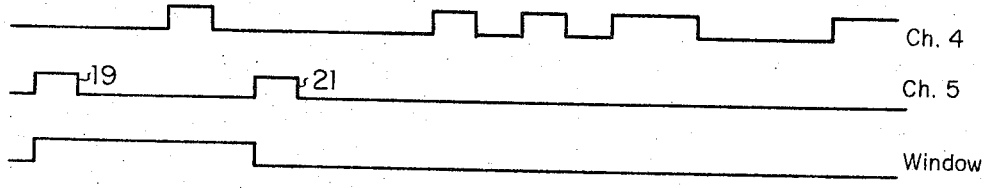
FIG. 3 illustrates a window in time defined by the interval between two events on a particular channel.

FIG. 3 again shows a signal carried on channel 4 used to instigate a trigger. Also illustrated in FIG. 3 is a signal on another channel, channel 5, which may be used to define a window in time. According to this embodiment of the invention the window in time is defined as the time interval between the occurrence of two 1 bits on channel 5. Thus if the two bits labeled 19 and 21 are used to define the beginning and ending point of the time interval, the window will be 5 clock cycles long as illustrated schematically by the channel labeled "window". It is to be understood that this channel labeled "window" is shown merely for illustrative purposes and that no actual channel is required since the occurrences of the pulses 19 and 21 are sufficient to define the window.

FIG. 4 again shows the trigger channel 4 accompanied by another channel labeled 5 on which appears a pulse 22. According to this embodiment of the invention the pulse 22 is used to initiate a time period, shown as $t_1$, after which the window is open. This time period $t_1$ may be either a predetermined number of clock cycles or an absolute interval in time. If it is desired that the pulse 22 should immediately initiate the opening of the window, the time $t_1$ may be set at zero. According to various embodiments of the invention, once the window is open, its duration may be determined according to a predetermined number of clock cycles, or an absolute interval in time; for purposes of illustration, an interval of five clock cycles is shown as the width of the window.

The counting of the clock cycles may be accomplished, for example, by using standard counting circuits in conjunction with pulses from a clock, which may be either internal to the instrument under test or external.

Figure 5:
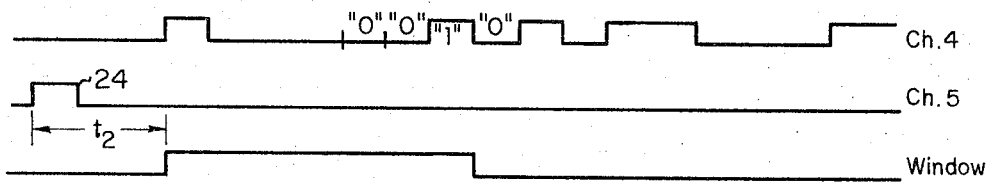
FIG. 5 shows a window which is opened a predetermined time after some event, and remains open until a trigger signal is initiated.

FIG. 5 illustrates an embodiment of the invention in which a pulse 24 initiates a time period $t_2$ before the opening of a window, as was described above in connection with FIG. 4. However, according to this embodiment, the window remains open until a bit sequence is sensed on channel 4 which corresponds to the predetermined bit pattern which is to be matched in order to instigate a trigger signal. Thus, the duration of the window is determined by the looked-for occurrence itself.

Figure 6:
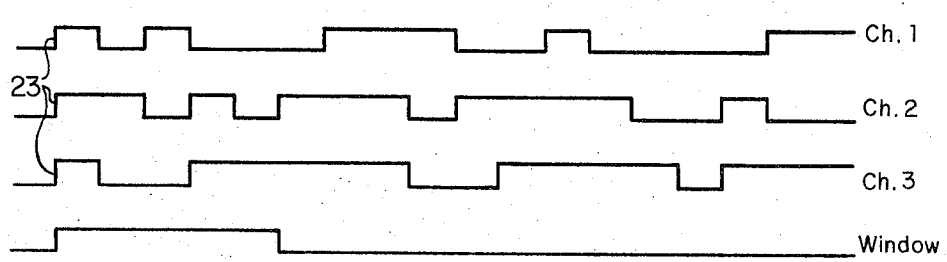
FIG. 6 illustrates a window in time measured from an initial event which is the simultaneous occurrence of a particular bit arrangement on several channels.
Figure 4:
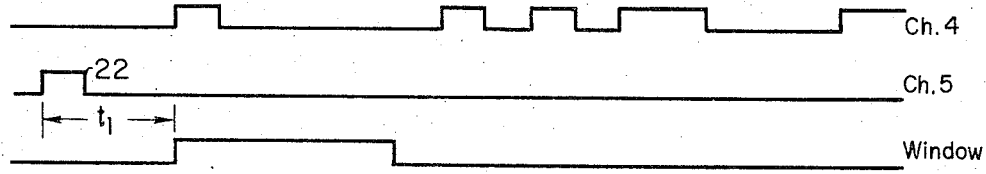
FIG. 4 shows a window in time in which the opening and closing of the window are defined by a number of clock cycles or an absolute time interval measured from an event on a particular channel.

FIG. 6 shows a "window" which may be, for example, defined by some number of clock cycles occurring after some initial event, much as was described in connection with FIG. 4. According to this embodiment of the invention, however, the initial event is the occurrence of a particular bit pattern seen in parallel on several other channels. For purposes of illustration, channels 1, 2, and 3 are shown, and the coincidence of three 1 bits on these channels, labeled 23 is initial event from which the window is to be measured. Although the window is here shown to be defined by a predetermined number of clock cycles after the initial event, it is to be understood that other methods may also be used to determine the end point of the window; e.g., the occurrence of another coincidence on various channels, or the occurrences of a single 1 bit on one preselected channel may also be used.

Figure 7:
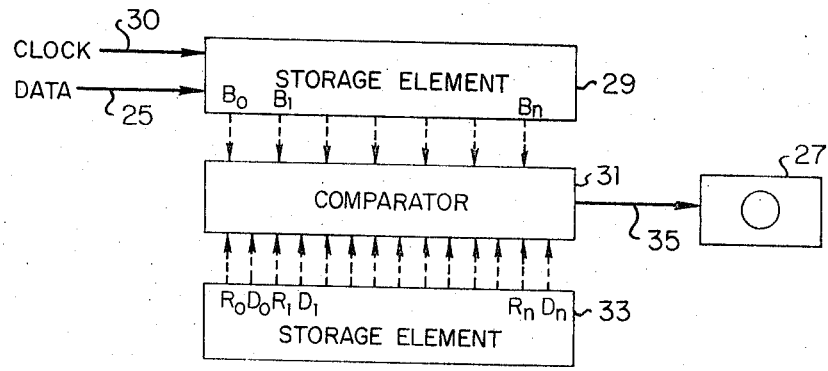
FIG. 7 shows an embodiment of the invention in which a predetermined bit pattern is stored and transferred to a comparator to be compared to the bit sequence on a selected channel in order to instigate a trigger signal to a test instrument.

FIG. 7 shows a data channel 25 which carries information used to initiate a trigger signal to the test instrument 27 shown here for purposes of illustration as an oscilloscope. The data channel 25 is serially inputted to an information storage element 29, which may be, for example, a shift register, or a random access memory or a tapped delay line. Another input to the storage element 29 is a clock signal 30 used to control the rate of data input from channel 25. The successive 1 or 0 states of the information on the data channel 25 are represented by the letters $B_0 \ldots B_n$. These bits of information are continuously monitored from the storage element 29 by a comparison device 31, which may be for example, a binary comparator with provision for a "don't care" override. Another storage element 33 is shown which contains a predetermined bit pattern. The elements of this bit pattern are represented in the figure by $R_0 \ldots R_n$. Also stored in storage element 33 are a sequence of bits $D_0 \ldots D_n$ which are 1 ("true") if the state of the corresponding bit in the data channel 31 is irrelevant to the generation of the trigger signal. These bits $D_0 \ldots D_n$ thus provide the "don't care" override. The storage element 33 which stores the predetermined bit pattern may be, for example, a shift register, or a sequence of switches, or a read only memory. In operation the bit states $R_0 \ldots R_n$ and $D_0 \ldots D_n$ are continuously monitored by the comparison element 31 where each bit is compared with the corresponding bit B from the sequence $B_0 \ldots B_n$ of the data channel. When a coincidence between the relevant bits of the bit patterns $B_0 \ldots B_n$ and $R_0 \ldots R_n$ occurs the comparison element 31 generates a trigger signal 35 which is sent to the test instrument 27, to be used to synchronize the test instrument 27 to the instrument under test.

Figure 8:
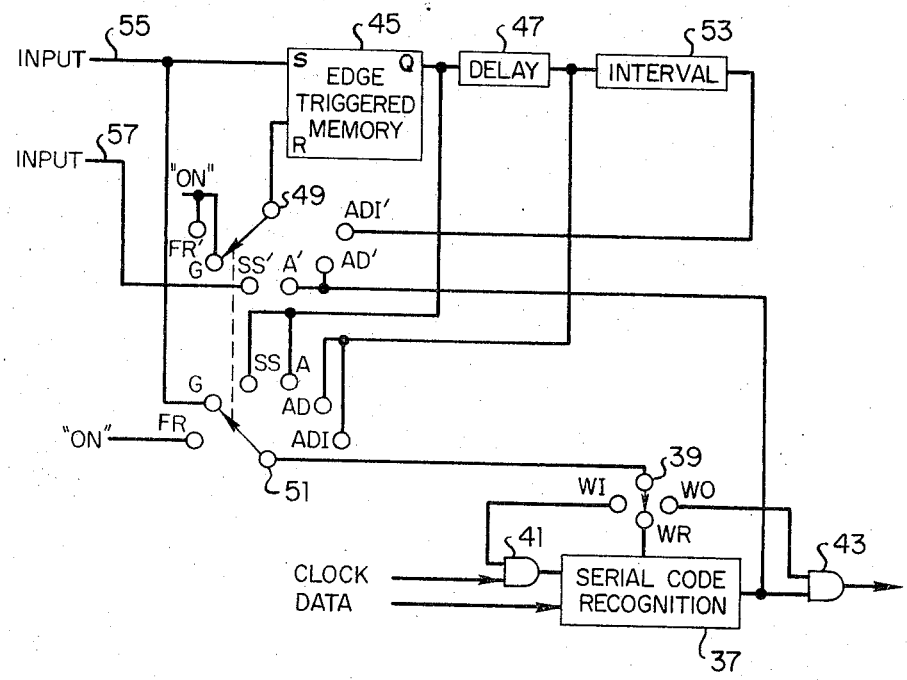
FIG. 8 illustrates how various windows in time may be generated and used in conjunction with serial code recognition to initiate a trigger signal.

FIG. 8 shows a serial code recognition block 37, which schematically represents the storage and comparison blocks of FIG. 7. A signal is sent to the input terminal of a switch 39. To implement the use of a "window" for determination of a time interval within which a trigger signal may be generated, a signal is applied to switch 39. Switch 39 provides 3 different ways of implementing the window depending on which of the terminals WI, WR, WO the switch is connected to. For example, if the switch is connected to the output contact label WI (window input) then the window signal will be directed to an AND gate 41, the other input to the AND gate being a clock channel which serves to advance the inputting of data into the serial code recognition block 37. Since the output of the gate 41 will be "off" unless the window signal is "on", no data will be advanced into the code recognition block 37 unless the window is open (i.e., unless an "on" signal appears at switch 39). Alternately, the window signal may be connected to the output terminal WO (window output) of the switch 39. In this case, the window signal is directed to the AND gate 43 along with the output of the serial code recognition block 37. Unless the window signal is "on", no trigger signal will appear at the output of AND gate 43, even though code recognition may have been taking place within the block 37. Yet, another way to implement the window function is illustrated by connecting the window signal to the output terminal WR (window reset). In this case, the window signal is fed to a reset terminal input of serial code recognition block 37 where it resets the entire code recognition block in preparation for receiving input data to be compared with a predetermined bit pattern.

In this embodiment of the invention, the window signal to be applied to switch 39 is generated using two multi-terminal switches 49 and 51 in conjunction with several logic blocks, as will be discussed in detail below. The logic block 45 is an "edge triggered memory" by which we mean a logic block which is responsive only to the leading edge of a pulse. Thus when a pulse is inputted at terminal S of edge triggered memory 45 an output signal is generated at output terminal Q, in response to the leading edge of the input pulse. The output signal remains in the "on" condition until a pulse appears at terminal R, at which time the output returns to zero. Edge triggered memory 45 may be, for example, a standard digital flip-flop or latch with an electronic differentiator positioned directly before each of the inputs S and R. Alternately, the edge triggered memory 45 may be constructed in a well-known manner using standard electronic logic gates and a flip-flop circuit. The delay block 47 represents schematically a block of digital circuitry which generates a delay time which may be either a fixed number of clock cycles or an absolute interval in time. This delay block 47 may, for example, include electronic counter circuits in conjunction with a clock. An interval generator 53 serves to generate another time interval which also may be either an absolute interval in time a predetermined number of clock cycles, and may be constructed in a similar manner to delay generator 47.

The various ways in which a window may be generated can be understood by reference to the various positions of the switches 49 and 51. These switches operate in tandem as indicated by the dotted line in the figure. For example, when switch 51 is positioned at the terminal labeled FR (free run) then a continuous "on" signal is sent to switch 39. The serial code recognition block 37 therefore operates independently of any window signal.

When switch 51 is connected to terminal G (gate) an input signal 55 is sent directly to switch 39, and hence to the code recognition block 37. Thus a window will open when the input signal 55 is "on". The input signal 55, as well as another input signal 57 may be derived directly from various channels of a digital device under test, or from logical combinations of the information on such channels.

A "start-stop" window may be created by connecting switch 51 to the terminal labeled SS (start-stop). When switch 51 is so positioned, switch 49 will be simultaneously positioned at the corresponding terminal SS'. It can be seen that the input 55 is then directed into terminal S of edge triggered memory 45 and that the output from terminal Q of edge triggered memory 45 is connected to contact SS of switch 51. Therefore switch 51 will send an "on" signal to switch 39 in response to the leading edge of the "on" signal seen on input 55. This signal will remain "on" until the leading edge of a signal pulse is sensed at terminal R of edge triggered memory 45. This latter signal pulse is an input pulse labeled 57, and is connected with terminal R through terminal SS' of switch 49. When such a pulse occurs the output Q of edge triggered memory 45 will return to zero and the window signal sent from switch 51 will be turned off.

If switch 51 is positioned at terminal A (arm) a window signal will be directed to switch 39 when an input pulse is received on input 55 as described above. However, since switch 49 is connected to contact A' which is in turn connected with output of serial code recognition block 37 the window will remain "on" until the code recognition block 37 has recognized a bit pattern and generated an output signal. This output signal will be sent into terminal R of edge triggered memory 45 thereby turning off the output Q of edge triggered memory 45. Thus, in this configuration the window is opened by an input signal, and remains open until code recognition has occurred.

When switch 51 is connected to output contact AD (arm with delay) the opening of a window is again dependent upon the receipt of an input signal of a pulse on the input terminal 55, but in this case a pulse will not be sent to switch 39 until some time has elapsed after the receipt of pulse at terminal 55. The time delay is set by delay block 47, and may be measured either in absolute time or by a number of clock cycles, as described above. It can be seen from the figure that the window will again remain open until code recognition has occurred, a signal thereby being directed to terminal R of edge trigger 45 and through contact AD' of switch 49.

Finally, switch 51 may be connected to contact ADI (arm delay with interval), in which case the opening of the window occurs a finite time after the receipt of a signal at input terminal 55 as described above. In this case, however, the width of the window is determined by interval generator 53 which sends a pulse to terminal R of edge triggered memory 45 through contact ADI' of switch 49. Thus the width of the window may be a preselected absolute time interval, or a preselected number of clock cycles.

I claim:

1. A method for synchronizing an electronic test instrument to a multi-channel digital electronic system under test, said method comprising the steps of:
   providing digital input signals from one or more channels of the digital electronic system under test, the input signal on each channel comprising a sequence of "on" and "off" bits;
   storing a preselected bit pattern of "on" and "off" bits;
   generating a time interval indication to serve as a window in time;
   sensing the bits in a first one of the input signals to detect the occurrences, if any, of sequences of bits corresponding to the preselected bit pattern; and
   generating a trigger signal input to the electronic test instrument whenever a sequence of the detected bits corresponds to the preselected bit pattern during said window in time.

2. A method as in claim 1 wherein the step of generating a time interval indication to serve as a window in time comprises the step of sensing the information bits in a second one of the input signals and generating an indication of the duration of a continuous sequence of "on" pulses, if any, sensed in the second input signal to serve as the window in time.

3. A method as in claim 1 wherein the step of generating a time interval indication to serve as a window in time comprises the step of sensing the information bits in a second one of the input signals and generating an indication of the duration between two successive "on" bits sensed in the second input signal to serve as the window in time.

4. A method as in claim 1 wherein the step of generating a time interval indication to serve as a window in time comprises the steps of:
   sensing the information bits in a second one of the input signals;
   generating a first associated time interval indication measured from the occurrence of an "on" bit sensed in the second input signal; and
   generating a second associated time interval indication measured from the end of said first associated time interval indication, said second associated time interval indication serving as the window in time.

5. A method as in claim 4 wherein the first associated time interval indication is a predetermined number of clock cycles of the system under test.

6. A method as in claim 4 wherein the first associated time interval indication is a predetermined absolute duration of time.

7. A method as in claim 4 wherein the second associated time interval indication is a predetermined number of clock cycles of the system under test.

8. A method as in claim 4 wherein the second associated time interval indication is a predetermined absolute duration of time.

9. A method as in claim 1 wherein the step of generating a time interval indication to serve as a window in time comprises the steps of:
   sensing the information bits in a plurality of the input signals to detect an occurrence of a predetermined concurrence of bits on the plurality of input signals;
   generating a first associated time interval indication measured from the concurrence of bits; and
   generating a second associated time interval indication measured from the end of said first associated time interval indication, said second associated time interval indication serving as the window in time.

10. A device for synchronizing an electronic test instrument to a multi-channel digital electronic system under test, said device comprising:
    first means for storing a digital signal from one of the channels of the digital electronic system under test, said digital signal comprising a sequence of "on" and "off" bits;
    second means for storing a preselected pattern of "on" and "off" bits;
    window making means for generating a time interval indication to serve as a window in time; and
    comparison means interconnected with the window making means, the first means, and the second means for comparing the digital signal stored in the first means with the preselected bit pattern stored in the second means to detect a correspondence therebetween, and generating a trigger signal to be sent to the electronic test instrument whenever such a correspondence is detected during said window in time.

11. A device as in claim 10 wherein said window making means includes:
    edge trigger means responsive to the leading edge of an input pulse;
    delay means interconnected with the edge trigger means for generating a first associated time interval indication;
    interval means interconnected with the delay means for generating a second associated time interval indication; and
    switch means interconnected with the edge trigger means, the delay means, the interval means, and the comparison means, for directing signals between the window making means and the comparison means.

12. A device as in claim 11 wherein the delay means generates a predetermined absolute interval in time.

13. A device as in claim 11 wherein the delay means generates a predetermined number of clock cycles of the instrument under test.

14. A device as in claim 11 wherein the interval means generates a predetermined absolute interval in time.

15. A device as in claim 11 wherein the interval means generates a predetermined number of clock cycles of the instrument under test.

* * * * *